United States Patent Office 3,359,237
Patented Dec. 19, 1967

3,359,237
ORGANOSILICON COMPOUNDS AND THEIR USE
Jean Boissieras, Louis Frederic Ceyzeriat, and Marcel Joseph Celestin Lefort, Paris, France, assignors to Rhone-Poulenc S.A., Paris, France, a French body corporate
No Drawing. Original application Feb. 27, 1964, Ser. No. 347,664, now Patent No. 3,318,898, dated May 9, 1967. Divided and this application Feb. 16, 1966, Ser. No. 544,325
6 Claims. (Cl. 260—46.5)

ABSTRACT OF THE DISCLOSURE

The invention provides compositions stable in the absence of moisture and vulcanizable at ambient temperature in the presence of moisture comprising an organo-(triaminoxy)silane and an α,ω-hydroxy-diorganopolysiloxane.

---

This application is a divisional of our application Ser. No. 347,664, filed Feb. 27, 1964, now U.S. 3,318,898.

This invention relates to organosilicon compounds and their uses.

It is possible to obtain silicone elastomers by adding a linear diorganopolysiloxane having hydroxyl groups at the ends of the chains, to an organotriacyloxysilane, more especially methyl triacetoxysilane, and exposing the composition obtained to the action of a moist atmosphere. These organotriacyloxysilanes react with the hydroxyl groups of the diorganopolysiloxane to give diorganopolysiloxanes blocked at the ends of the chains by groups of the formula:

$$(AcO)_2Si(R)O—$$

in which Ac represents an acyl group and R an organic group attached to the silicon atom by a carbon atom. These compounds thus blocked at the ends of the chains are stable in the absence of moisture, but vulcanise, even without heating, on simple exposure to a moist atmosphere.

The present invention provides new organosilicon compounds useful in the production of compositions vucanisable at ambient temperature in the presence of moisture, but stable in storage in the absence of moisture.

The new compounds of the invention are the organoaminoxysilanes of the general formula:

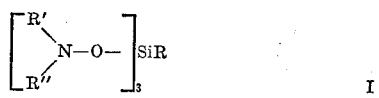

I in which R, R' and R" are the same or different and represent inert, optionally substituted, hydrocarbon radicals, R' and R" being optionally joined to form, with the adjacent nitrogen, a heterocyclic ring. The radicals R, R' and R" must be inert, i.e. they must not be capable of reacting under the operating conditions hereinafter described nor interfere with the vulcanisation of the compositions in whose formation the compounds of Formula I participate. Preferably R, R' and R" represent alkyl, alkenyl, aryl, or aralkyl radicals, R' and R" being optionally joined to form, with the adjacent nitrogen atom, a five or six membered heterocyclic ring. More especially R, R' and R" may represent lower alkyl, lower alkenyl having a single double bond, more particularly vinyl or allyl, cycloalkyl of 5 or 6 carbon atoms, such as cyclopentyl or cyclohexyl, cycloalkenyl of 5 or 6 carbon atoms, such as cyclohexenyl, phenyl, (lower alkyl)phenyl, e.g. tolyl, xylyl, or cumenyl, or phenyl(lower alkyl), e.g. benzyl or phenylethyl, R' and R" being optionally joined together to form, with the adjacent nitrogen atom, a pyrrolidin-1-yl, piperidin-1-yl, (lower alkyl)piperidin-1-yl, or 4-(lower alkyl)-1-piperazinyl radical. These radicals may be halogenated so as to give, e.g., chlorocyclohexyl, chlorophenyl or chlorobenzyl radicals. When R' and R" together with the adjacent nitrogen atom form a heterocyclic ring this ring may contain a second hetero atom, and may be alkylated, more especially by methyl, ethyl or propyl substituents. The residue,

may thus be, for example, a pyrrolidin-1-yl, piperidin-1-yl, (lower alkyl)piperidin-1-yl, e.g. monomethylpiperidin-1-yl, dimethylpiperidin-1-yl, monoethylpiperidin-1-yl, or diethylpiperidin-1-yl, or 4-(lower alkyl)-1-piperazinyl, e.g. 4-methyl-1-piperazinyl or 4-ethyl-1-piperazinyl. [By "lower" alkyl and alkenyl is meant alkyl and alkenyl of up to 4 carbon atoms.]

The compounds of Formula I may be added to α,ω-hydroxy-diorganopolysiloxanes, optionally mixed with fillers, diluents, pigments and other adjuvants usually employed in the field of compositions for organosilicic elastomers, to give compositions which vulcanise in the presence of water, for example simply on contact with a moist atmosphere.

The invention accordingly includes within its scope compositions vulcanisable at ambient temperature in the presence of moisture, comprising an organoaminoxysilane as aforesaid and a diorganopolysiloxane of the formula:

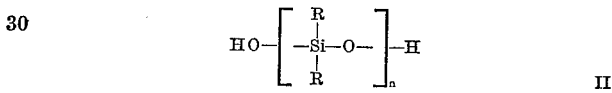

II in which R is as hereinbefore defined and n is 5 to 10,000.

The compounds of Formula II may be homopolymers or copolymers. In addition, the compositions may contain mixtures of homopolymers or copolymers of Formula II.

The new compositions may contain diluents and fillers. For example, they may contain organopolysiloxanes free from reactive groupings, or fillers, more especially reinforcing fillers such as silicas of combustion and silica aerogels of large surface area, which may be treated with an organosilicic derivative. Apart from these reinforcing fillers, there may also be employed fillers such as ground, crude silicas, ground quartz, alumina, titanium dioxide, zinc oxide, calcium carbonate, graphite, carbon black, polyvinyl chloride or powdered cork. The proportion of these fillers in relation to the remaining constituents of the composition may vary within fairly wide limits depending upon the nature of the filler and the application envisaged. In practice, compositions with fillers are ordinarily prepared by first mixing the diorganopolysiloxane of Formula II with the filler or fillers and then adding the organoaminoxysilane of Formula I. If the mixture is too viscous, or if the final composition is to be applied in fluid form, one or more diluents may be added, the only condition being that the diluents employed must not interfere with the vulcanisation of the composition. For this purpose there may be used, for example, benzene hydrocarbons, optionally halogenated, such as benzene toluene, xylene, monochlorobenzene, petroleum ethers, white spirit, halogenated derivatives of aliphatic hydrocarbons such as trichloroethylene and tetrachloroethylene, or aliphatic ethers, such as diethyl ether, dipropyl ether, or dibutyl ether. A single solvent or mixtures of solvents of the same or different types may be employed.

When the compositions are to be stored, the compounds of Formula I are mixed with the compounds of Formula II under conditions excluding water in liquid or vapour form. Generally, a reaction occurs immediately the reactants are brought into contact, without any necessity for heating. However, heating may be carried out if desired. Generally speaking, temperatures between 15° and 100° C. are quite suitable, but these temperatures are not essential and may be departed from to some extent.

The compositions then consist at least in part of compounds of the general formula:

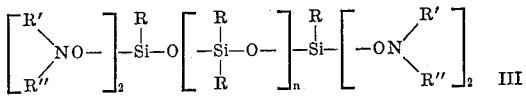 III in which the various symbols are as hereinbefore defined. The compositions may optionally be made up in the presence of liquid organic diluents which are incapable of reacting chemically with compounds of Formulae I, II or III. The presence of a diluent is especially preferred when the compound of Formula II is of high molecular weight. Depending upon the use for which the compositions are intended, the solvent may be eliminated, or the liquid compositions may be stored and used as such.

When the compositions contain a filler and are intended to be stored, the latter must, of course, be added to the composition in very dry form, under conditions excluding any introduction of water. It is, however, possible first to mix the fillers with the diorganopolysiloxane of Formula II and, optionally, the liquid diluent and then to eliminate any trace of water (if the reactants employed were not sufficiently anhydrous), before adding to the mixture the compound of Formula I.

The compositions prepared in the absence of moisture remain stable in the absence of moisture for several months without any appreciable change in their properties. In the presence of water, however, for example simply under the influence of a moist atmosphere, they react to give solid elastic compounds.

The compositions of the invention are suitable for use in all doping, coating, caulking and adhesive bonding applications, for the preparation of composite articles, joints and other solid elastic articles for which compositions based upon diorganopolysiloxanes having diacyloxysilyl groupings have hitherto been used. As compared with the latter, the new compositions have the advantage that they do not liberate acid in the course of setting, that they generally vulcanise more quickly, and that they give elastomers having better resistance to heat in a confined atmosphere, that is to say, when heated at high temperatures, for example up to about 250° C., without or practically without ventilation.

The vulcanisation of the compositions of the invention is the more rapid in proportion as the quantity of water present is greater and in proportion as they offer, for a given mass, a larger surface of contact with the moist medium, e.g. the air. The vulcanisation takes place at ambient temperature (15–20° C.), but is more rapid in proportion as the temperature is higher. In addition, the speed of vulcanisation depends to some extent upon the nature of the radicals R′ and R″, upon their size and upon the molecular weight of the polymers employed. The substituted hydroxylamine liberated by hydrolysis in the reaction in the presence of moisture exerts a catalytic effect as the reaction progresses. In addition, it is possible to prepare compositions containing a proportion of accelerator. More especially, this procedure may be adopted when, in order that the compositions may have particular characteristics, it is necessary to choose a diorganopolysiloxane having aminoxy groups, in which the aminoxy groups are not very reactive. As accelerators there may be employed amines or organic-tin derivatives, such as, for example, the salts of organomono- or di-carboxylic acids with diorgano-tins. Such accelerators are preferably added after all the other constituents of the compositions have been mixed.

The organoaminoxysilanes of Formula I are prepared, in accordance with the invention, by reacting, under anhydrous conditions and in the presence of a binding agent for a halogen hydracid, a halosilane of the formula:

with three molecular proportions of a substituted hydroxylamine of formula:

R′R″NOH

R, R′ and R″ being as hereinbefore defined. The reaction is generally carried out in an organic diluent which is inert under the operating conditions. The reaction may be represented as follows:

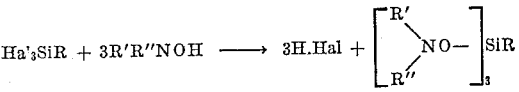

As binding agent, there may be employed inorganic or organic products capable of reacting with the liberated halogen hydracids, but inert to the other compounds involved in the process. It is therefore possible to use inorganic products such as calcium carbonate or magnesia, but tertiary amines are preferably employed, especially trialkylamines whose alkyl radicals contain 1 to 4 carbon atoms, such as triethylamine, tripropylamine, tributylamine, or heteocyclic tertiary amines, such as pyridine and its various alkylated derivatives such as the lutidines and picolines. As diluent, there may be employed any of the diluents hereinbefore mentioned as diluents for the compositions of the invention.

The temperature at which the reaction is carried out may vary within fairly wide limits. For example, it is possible to operate at a temperature between −20° and 100° C., but these limits are not absolute and it is possible to depart somewhat therefrom where necessary.

When the reaction has ended, the product is filtered to separate the hydracid salt which has formed and any other solid product accompanying it, and the solvent is then distilled off. The filtered solution may be employed immediately for the preparation of the compositions of the invention.

The proportion of organoaminoxysilane employed in the compositions of the invention is conveniently 1% to 10% by weight of the diorganopolysiloxane.

The following examples illustrate the invention.

*Example 1.—Methyl tri(diethylaminoxy)silane*

Into a one-litre, round-bottomed flask provided with a stirrer, a condenser and a dropping funnel are introduced: anhydrous benzene (400 cc.); triethylamine (63 g.); and diethylhydroxylamine (58 g.). There is then added with stirring a solution of 30 g. of methyl trichlorosilane in 30 cc. of anhydrous benzene. An exothermic reaction then takes place and the temperature of the mixture rises to 45° C. The product is stirred for 16 hours at ambient temperature (about 20° C.) and then heated under reflux for 8 hours. The triethylamine hydrochloride precipitate is filtered off under anhydrous conditions and washed with 5× 200 cc. of anhydrous benzene. The organic solutions are combined and the solvent is distilled off. The oily residue is freed from triethylamine hydrochloride residues by filtration through "Clarcel," and then distilled under 0.3 mm. Hg. 28 g. of methyl tri(diethylaminoxy)silane are obtained, B.P./0.3 mm. Hg=75° C., $n_D^{20}=1.4380$.

*Example 2.—Tris(diethylaminoxy)phenylsilane*

Into a three-litre, round-bottomed flask provided with a mechanical stirrer, a thermometer, a condenser and a dropping funnel, are introduced: anhydrous ether (1200 cc.); triethylamine (66.6 g.); and diethylhydroxylamine (58.8 g.). The apparatus is flushed with dry nitrogen and cooled to −20° C. with an acetone-Dry Ice cooling bath. A solution of 42.3 g. of phenyltrichlorosilane in 100 cc. of anhydrous ether is added thereto with brisk stirring, and the mixture is stirred for 16 hours at ambient temperature (20° C.). The triethylamine hydrochloride precipitate is filtered off under anhydrous conditions and washed with 5× 200 cc. of anhydrous ether. The organic solutions are combined and the solvent is distilled off. The oily product is freed from triethylamine hydrochloride residues by filtration through "Clarcel" and then distilled under 0.1 mm. Hg. 60 g. of tris (diethylaminoxy) phenylsilane are then obtained, B.P./0.1 mm. Hg=118–120° C., $n_D^{20}$=1.4820. This is a yield of 81% calculated on the phenyltrichlorosilane used.

*Example 3.—Ethyl tri(piperidin-1-yloxy)silane*

Into a one-litre, round-bottomed flask are introduced 500 cc. of anhydrous benzene, 60.5 g. of 1-hydroxypiperidine and 60.5 g. of triethylamine. A solution of 30 g. of ethyl trichlorosilane in 30 cc. of anhydrous benzene is added and the mixture is then heated under reflux for 8 hours. After cooling, the triethylamine hydrochloride precipitate is filtered off under anhydrous conditions, and washed with 3× 200 cc. of anhydrous benzene. The benzene solutions are combined and the benzene distilled off. The residue is distilled under a high vacuum, and ethyl tri(piperidin-1-yloxy)silane is obtained, B.P./0.01 mm. Hg=150–155° C., M.P. 53° C.

*Example 4*

100 g. of a dimethylpolysiloxane oil, having a viscosity of 17,800 cst. at 25° C. and containing 0.12% by weight of hydroxyl radicals, are mixed with 4 g. of methyl tri(diethylaminoxy)silane for one minute at ambient temperature (25° C.) at a relative humidity of 21%. The product is then spread on a glass plate coated with Teepol so as to obtain a film about 1.4 mm. thick. After 5 minutes, the product is vulcanised on the surface, the interior still being liquid. After 1½ hours, the mass is internally vulcanised and the elastic film obtained can readily be detached from the glass plate.

*Example 5*

Into an apparatus provided with a heater and a stirrer are charged: 180 g. of a hydroxylated dimethylpolysiloxane oil having a viscosity of 106,000 cst. at 25° C. and containing 0.08% by weight of hydroxyl radicals; 17 g. of a dimethylpolysiloxane oil having a viscosity of hydroxyl radicals, are mixed with 4 g. of methyl trimethylsiloxy groups; 5 g. of silica of combustion ("Aerosil" brand); and 19 g. of "Celite Superfloss" silica. The materials are mixed at ambient temperature for 2½ hours and then gradually heated to 150° C., while the volatile products are removed by a current of dry nitrogen. The product is cooled and a mixture M is thus obtained. To 125 g. of this mixture are added in the absence of moisture 5.6 g. of methyl tri(diethylaminoxy)silane, and after intimate mixing, the product is packed in fluid-tight receptacles (aluminium tubes having a polyethylene stopper) to give a mixture M'.

When applied in a layer 1.5 mm. thick to a glass plate coated with Teepol and left in the ambient air having a relative humidity of 37% at 22° C., this mixture M' gives even after 5 minutes a film having a non-tacky surface, which gradually completely vulcanises, and which can be detached from the glass plate after 2 hours.

The specimens kept in fluid-tight tubes are not modified after preservation for 6 months at 20° C. When then applied in thin layers in the same way as the initial specimen, they give the same results.

62.5 g. of mixture M are mixed with 2 g. of methyl triacetoxysilane to give a mixture M". When applied in a layer 1.5 mm. thick to a glass plate coated with Teepol, and exposed to atmospheric moisture, this mixture M" gives a film having a non-tacky surface after 30 minutes. Vulcanisation then gradually completes, and the film can be detached from the glass plate after 5 hours.

A heating test in sealed tubes at 250° C. shows that the films obtained with the mixture M' have better stability than the films obtained with the mixture M".

*Example 6*

Into an apparatus similar to that employed in Example 4 are charged 100 g. of a diorganopolysiloxane oil, having methyl and vinyl radicals and containing one vinyl radical to 870 methyl radicals, and having a viscosity of 4000 centistokes at 25° C., 10 g. of silica of combustion ("Aerosil" brand), and 50 g. of titanium dioxide. The mixture is heated with stirring to eliminate moisture and, after cooling, 8 g. of ethyl tri(piperidin-1-yloxy)silane in solution in 50 g. of cyclohexane are added in the absence of moisture. The mixture first thickens and, after stirring for 4 hours, becomes a homogeneous paste which is sufficiently soft to be readily transferred to fluid-tight tubes.

A portion is spread on a glass plate in the ambient air having a relative humidity of 75% at 25° C. in a layer 1 mm. thick. After 10 minutes, the product is vulcanised on the surface, and the vulcanisation is complete after one hour, 50 minutes.

We claim:

1. A composition stable in the absence of moisture and vulcanisable at ambient temperature in the presence of moisture, comprising an organoaminoxysilane of the formula:

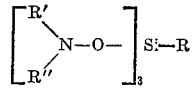

in which R, R' and R" are each selected from the group consisting of hydrocarbon radicals and halogen-substituted hydrocarbon radicals, R' and R" being optionally joined to form, with the adjacent nitrogen, a heterocyclic ring, and an α,ω-hydroxy-diorganopolysiloxane of the formula:

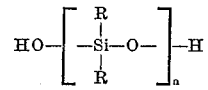

in which R is as hereinbefore defined and n is 5 to 10,000.

2. A composition as claimed in claim 1 in which the proportion of the organoaminoxysilane is 1 to 10% by weight of the diorganopolysiloxane.

3. A composition as claimed in claim 1 in which the diorganopolysiloxane is a siloxane selected from the class consisting of α,ω-hydroxydimethylpolysiloxane and α,ω-hydroxydimethylpolysiloxane in which a small proportion of the methyl groups has been replaced by vinyl.

4. A composition as claimed in claim 1 which also contains at least one filler.

5. A composition as claimed in claim 1, in which in the organoaminoxysilane, R is a member selected from the class consisting of alkyl of 1 to 4 carbon atoms and phenyl, and R' and R", when taken separately, are alkyl of 1 to 4 carbon atoms, and, when taken together with the adjacent nitrogen, constitute a piperidin-1-yl radical, and the diorganopolysiloxane is an α,ω-hydroxydimethylpolysiloxane, the proportion of the organoaminosilane being 1 to 10% by weight of the dimethylpolysiloxane.

6. A vulcanized composition formed by exposing the composition of claim 1 to moisture.

References Cited

UNITED STATES PATENTS 2,955,127   10/1960   Pike _____ 260—45.5
3,184,427   5/1965   Russell et al. _____ 260—46.5
3,280,072   10/1966   Frankland _____ 260—46.5
3,296,199   1/1967   Murphy _____ 260—46.5

DONALD E. CZAJA, *Primary Examiner.*

M. I. MARQUIS, *Assistant Examiner.*